United States Patent [19]
Chen

[11] Patent Number: 5,580,151
[45] Date of Patent: Dec. 3, 1996

[54] WARNING LIGHT MOUNTING ASSEMBLY

[76] Inventor: Chow-Fa Chen, No. 20, Lane 426, Sec 2, Chong Der Rd, Taichung, Taiwan

[21] Appl. No.: 508,765

[22] Filed: Aug. 4, 1995

[51] Int. Cl.[6] ............................................. F21L 5/00
[52] U.S. Cl. ...................... 362/72; 362/191; 362/396; 362/398; 248/215; 248/311.2
[58] Field of Search ........................... 362/35, 72, 457, 362/190, 191, 368, 396, 398, 418, 430, 285, 833, 80, 370; 248/214, 310, 314, 311.2, 215; 340/432

[56] References Cited

U.S. PATENT DOCUMENTS

| | | | |
|---|---|---|---|
| 2,655,337 | 10/1953 | Diesfeld | 362/396 X |
| 3,996,649 | 12/1976 | Podd | 248/215 |
| 4,431,038 | 2/1984 | Rome | 248/314 X |
| 4,542,447 | 9/1985 | Quakenbush | 362/370 X |
| 4,878,642 | 11/1989 | Kirby, Jr. | 248/311.2 |
| 5,143,335 | 9/1992 | Frankel | 248/215 |
| 5,303,133 | 4/1994 | Wagner | 362/191 X |
| 5,467,261 | 11/1995 | Whetstone | 362/328 |

*Primary Examiner*—James C. Yeung
*Assistant Examiner*—Thomas M. Sember
*Attorney, Agent, or Firm*—Charles E. Baxley, Esq.

[57] ABSTRACT

A warning light device includes a base for receiving a warning light member and having a pair of panels laterally extended outward. A pair of hooks are secured to one of the panels for hooking the base to the back support of the bicycle. Two securing members may engage with the dust shield of the bicycle and two bolts may secure the securing members to the panel so as to secure the base to the bicycle. The base includes a magnet member secured in the bottom portion for attaching the warning light device to the upper portion of the vehicle.

2 Claims, 3 Drawing Sheets

WARNING LIGHT MOUNTING ASSEMBLY

BACKGROUND OF THE INVENTION

1. Field of the Invention

The present invention relates to a warning light, and more particularly to a warning light mounting assembly.

2. Description of the Prior Art

Typical warning devices for use with bicycles and other vehicles comprise a number of reflective elements for reflecting lights from other vehicles so as to form a warning device. However, the reflective elements may not be clearly seen. Particularly, when a bicycle has such a warning device attached thereto, the drivers of the other vehicles may not clearly see the bicycles, particularly during the night.

The present invention has arisen to mitigate and/or obviate the afore-described disadvantages of the conventional warning devices.

SUMMARY OF THE INVENTION

The primary objective of the present invention is to provide a warning light mounting assembly which may attach warning light devices to bicycles, vehicles or to the typical triangular warning signs so as to form a safely warning light device.

In accordance with one aspect of the invention, there is provided a warning light assembly comprising a base including a hollow interior and including an open top, and including a pair of panels laterally extended outward therefrom, a warning light member engaged in the base, and hook means secured to the panels for hooking the warning light assembly to an object.

The warning light member includes a bottom portion having at least one recess formed therein, the base includes at least one pair of slots formed therein so as to define a resilient blade, the resilient blade includes at least one projection for engaging with the recess of the warning light member so as to stably secure the warning light member to the base.

The base includes an opening formed therein for disengaging the warning light member from the base.

The base includes a bottom portion having a magnet member secured thereto so as to attach the warning light assembly to a metal object.

In accordance with another aspect of the invention, there is provided a warning light assembly comprising a base including a hollow interior and including an open top, and including a first panel and a second panel laterally extended outward therefrom, a warning light member engaged in the base, hook means secured to the first panel for hooking the warning light assembly to a bicycle, a pair of securing members each including a lower portion having a hook element formed thereon for engaging with the bicycle, the securing members each including an upper portion having an ear laterally extended therefrom, and bolt means engaged with the ears of the securing members and engaged with the second panel so as to secure the base to the bicycle.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
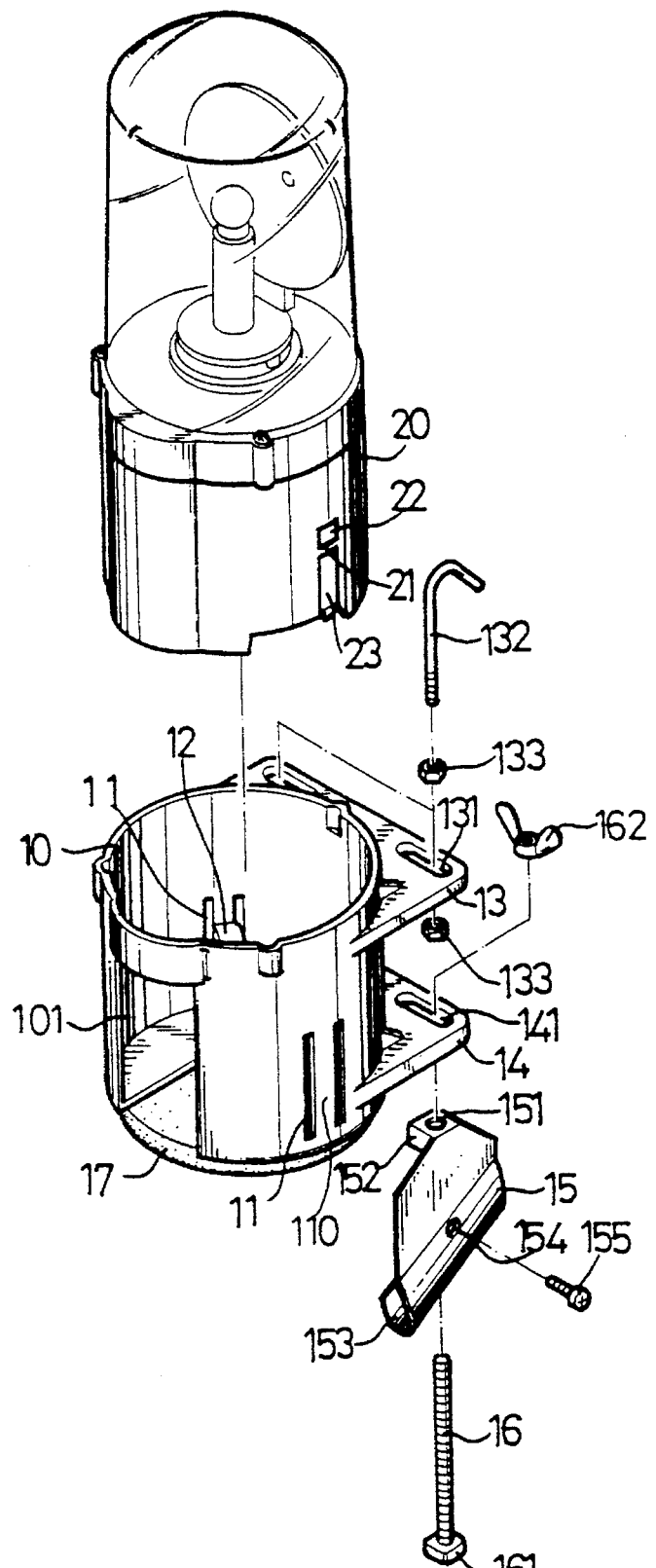
FIG. 1 is an exploded view of a warning light mounting assembly in accordance with the present invention.
Figure 2:
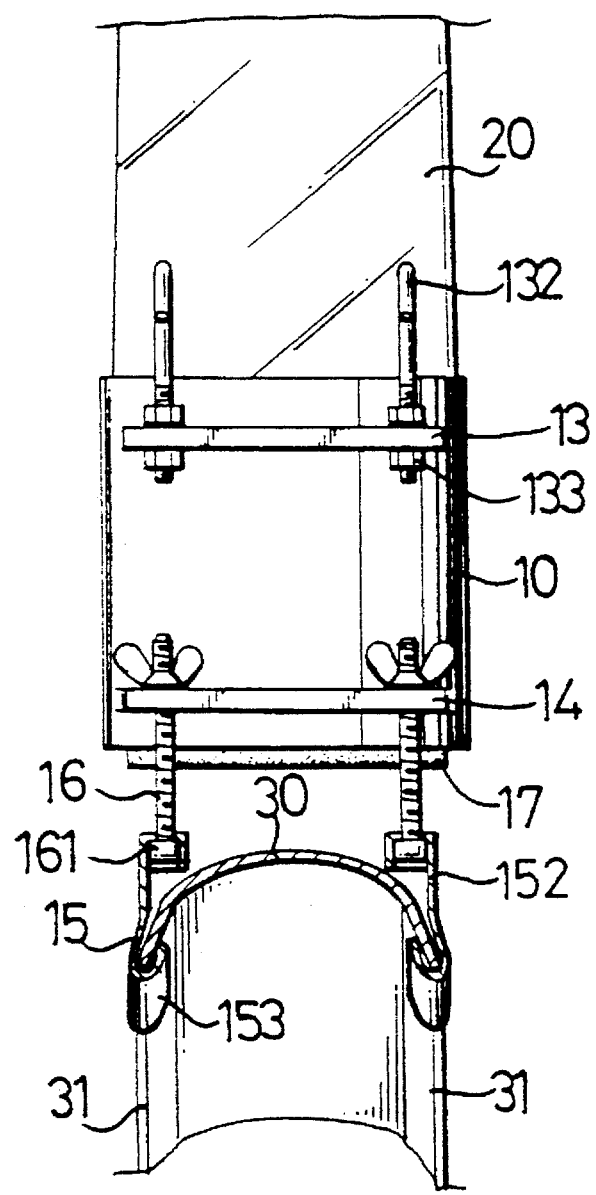
FIG. 2 is a front view of the warning light mounting assembly.

Referring to the drawings, a warning light mounting assembly in accordance with the present invention comprises a base 10 including a hollow interior and including an open top and including two pairs of slots 11 formed therein so as to define two resilient blades 110 therein. The resilient blades 110 each includes a projection 12 extended inward of the base 10. The base 10 includes a pair of panels 13, 14 laterally extended outward therefrom and each having a pair of oblong holes 131, 141 formed therein. A pair of hooks 132 have a lower portion engaged through the oblong holes 131 and threadedly engaged with the nuts 133 so as to be secured to the panel 13. Two bolts may engage with the oblong holes 141 of the panel 14 for engaging with wing nuts 162, and each includes a head 161. The base 10 includes an opening 101 formed in the side portion and includes a magnet member 17 secured to the bottom portion such that the base 10 may be easily attached to the vehicle.

A warning light member 20 includes a bottom portion having a pair of grooves 23 formed therein and having a partition 21 formed therein so as to form a pair of recesses 22 for engaging with the projections 12 of the base 10 such that the warning light member 20 may be stably secured to the base 10. The warning light member 20 can be disengaged from the base 10 via the opening 101. A pair of securing members 15 each includes a hook 153 formed in the bottom portion for engaging with the downward flange portions 31 of the dust shield 30 of the bicycles. The securing members 15 each includes a hole 154 for engaging with a screw 155 so as to be further solidly secured to the dust shield 30. The securing member 15 each includes an ear 152 laterally extended from the upper portion and having a hole 151 for engaging with the bolts 16.

Figure 3:
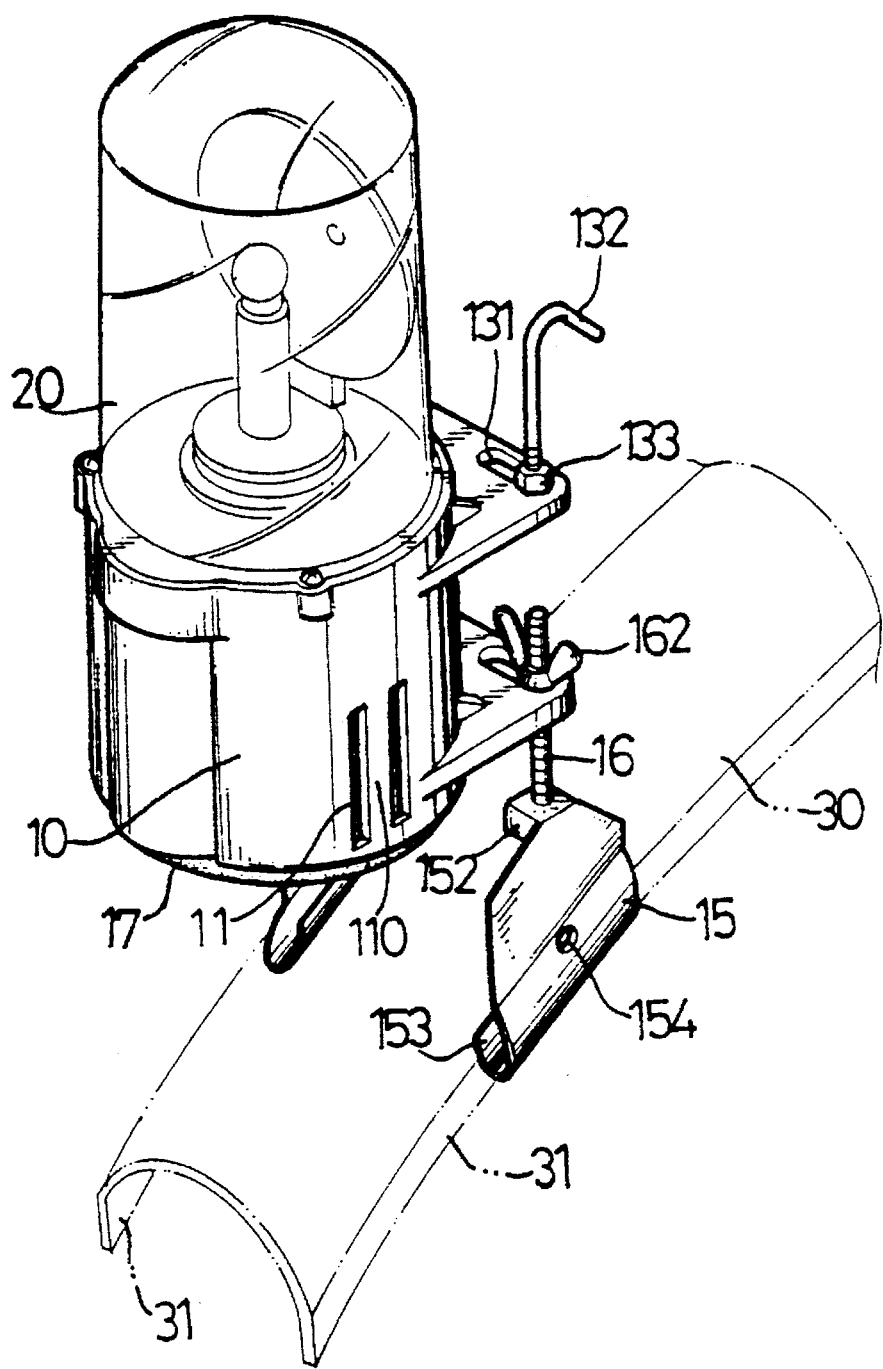
FIG. 3 is a perspective view illustrating the application of the warning light mounting assembly.

In operation, as shown in FIG. 3, the hooks 132 may engage with the back support of the bicycle or engage with the other object, such as the triangular warning device for vehicles, such that the warning light mounting assembly may be attached to the bicycles and other objects. The securing members 15 may further solidly secure the warning light mounting assembly to the rear portion of the bicycles. Furthermore, the warning light mounting assembly may also be easily secured on top of the vehicle or other metal objects by the magnet members 17.

Accordingly, the warning light mounting assembly in accordance with the present invention may easily attach the warning light device to the bicycles or other vehicles.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A warning light comprising:
   a base including a hollow interior surface, an exterior surface, an open top and a first panel and a second panel, with said first panel and said second panel laterally extended outward from said exterior surface, a warning light member engaged in said base, hook means secured to said first panel for hooking said warning light assembly to a bicycle, a pair of securing members each including a lower portion having a hook element formed thereon for engaging with the bicycle, said securing members each including an upper portion having an ear laterally extended therefrom, and bolt means engaged with said ears of said securing members and engaged with said second panel so as to secure said base to the bicycle.

2. A warning light assembly comprising:

a base including a hollow interior surface, an exterior surface, an open top and a pair of panels with said pair of panels laterally extended from said outer surface, a warning light member engaged in said base, and hook means secured to said panels for hooking said warning light assembly to an object wherein said warning light member includes a bottom portion having at least one recess formed therein, said base includes at least one pair of slots formed therein so as to define a resilient blade, said resilient blade includes at least one projection for engaging with said recess of said warning light member so as to stably secure said warning light member to said base.

* * * * *